United States Patent
Ledergerber et al.

[11] 3,798,720
[45] Mar. 26, 1974

[54] MULTIPLE-SPINDLE MACHINE TOOL

[75] Inventors: Alfred Ledergerber, Bielefeld; Rudolf Crachy, Babenhausen, both of Germany

[73] Assignee: Werkzeugmaschinenfabrik Gildemeister & Comp. AG, Bielefeld, Germany

[22] Filed: Jan. 19, 1972

[21] Appl. No.: 219,071

[30] Foreign Application Priority Data
Jan. 21, 1971 Germany............................ 2102732

[52] U.S. Cl. ........................................ 29/38 B, 82/3
[51] Int. Cl. ......................... B23b 3/32, B23p 23/02
[58] Field of Search............ 29/38 B, 38 A, 563, 64, 29/37 A; 82/3, 21 A, 21 B

[56] References Cited
UNITED STATES PATENTS
2,555,617   6/1951   Swartz et al......................... 29/38 B
3,448,643   6/1969   Kylin.................................. 82/21 A
3,343,243   9/1967   Renker............................ 82/21 A X
2,023,841   12/1935   Kingsbury...................... 82/21 B X

*Primary Examiner*—Gil Weidenfeld
*Attorney, Agent, or Firm*—Michael S. Striker

[57] ABSTRACT

A multiple-spindle automatic machine tool wherein the frame supports a discrete cross slide and a discrete main tool slide for each rotary work spindle. The cross slides and the main tool slides are respectively movable radially and axially of the workpieces at the respective working stations by discrete hydraulic drives whose reciprocable piston rods or feed screws are separably coupled with the corresponding slides by split nuts having two sets of threads of similar inclination but different leads and respectively meshing with external threads of the piston rods or feed screws and the respective slides to allow for accurate adjustment of slides in response to rotation of the nuts.

21 Claims, 9 Drawing Figures

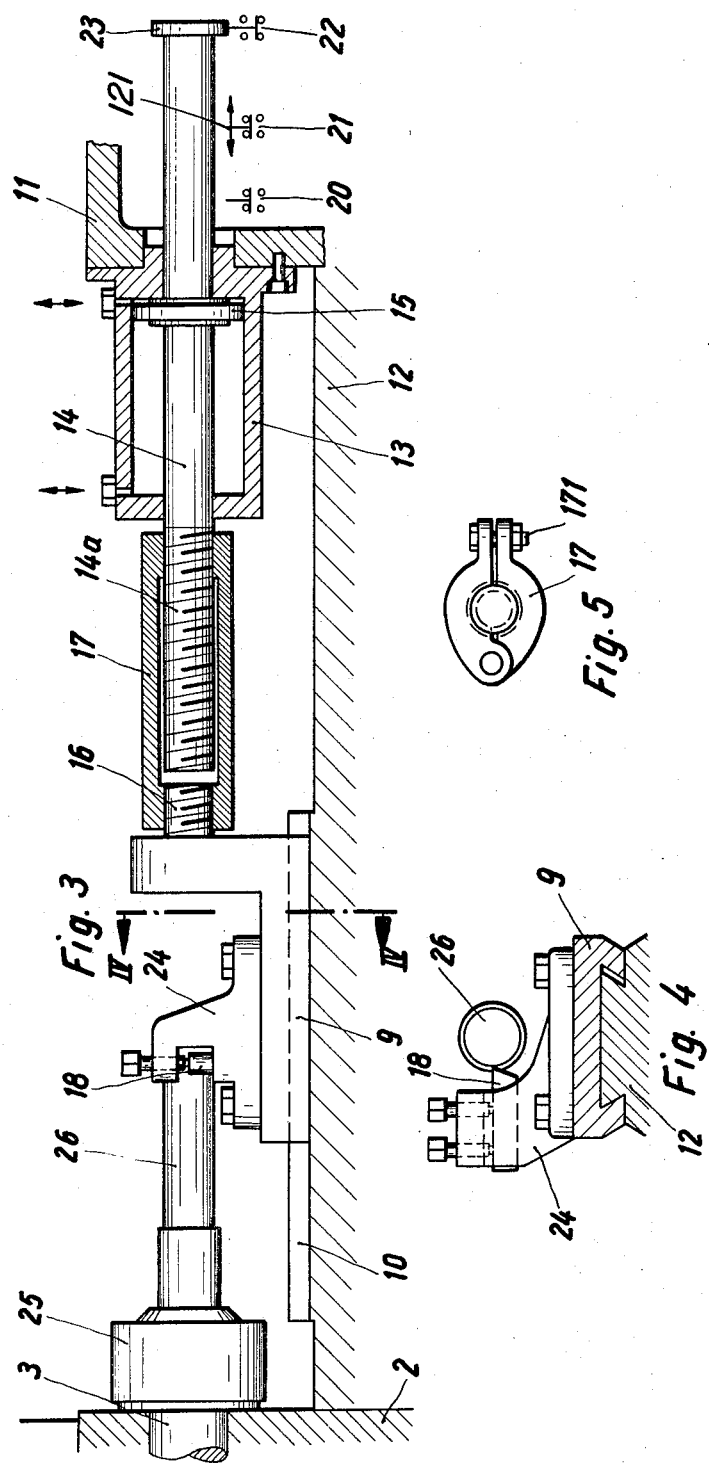

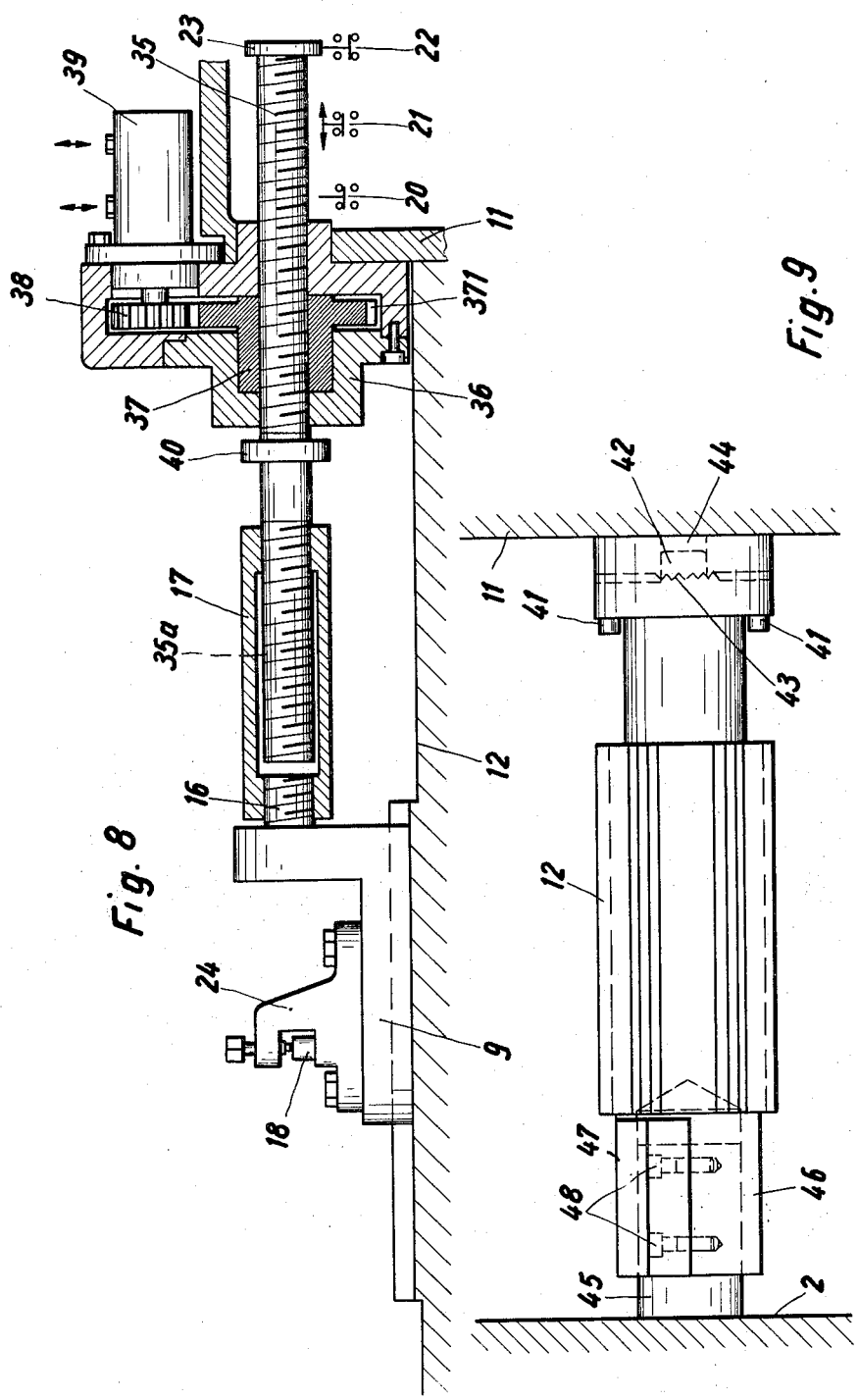

3,798,720

MULTIPLE-SPINDLE MACHINE TOOL

BACKGROUND OF THE INVENTION

The present invention relates to multiple-spindle bar or chucking machine tools, and more particularly to improvements in automatic multiple-spindle machines wherein the indexing of the carrier for work spindles, the rotation of work spindles, and the movements of various tool supporting slides are initiated and terminated by an automatic control system. Still more particularly, the invention relates to improvements in multiple-spindle machines wherein the tools can be mounted on one or more cross slides or side slides and on one or more main tool slides. The tools which are carried by the cross slide or slides are fed transversely of the workpieces, and the tools which are mounted on the main tool slide or slides are fed lengthwise of such workpieces.

In presently known multiple-spindle machines, the movements of cross slides and main tool slides are regulated by cams which are mounted on one or more control shafts. Additional cams must be provided if the machine is to use one or more attachments, such as for thread cutting, end-working, cross-milling and/or other operations. The transmission of motion from the cams to the respective slides and attachments takes place by way of mechanical means, such as linkages, which often occupy much room and contribute to the bulk and crowdedness of the machine. Thus, the mechanical motion transmitting parts often extend into the region of the working stations to thus interfere with access to the workpieces and/or tools. Furthermore, such parts can interfere with orderly evacuation of shavings and chips. Another drawback of such conventional machines is that each change in setup requires removal and replacement of a large number of cams, gears, links, levers and analogous parts; this is a time-consuming operation which prolongs the periods of idleness of the machine. Consequently, such types of multiple-spindle machines are normally used only for the manufacture of large numbers (long runs) of identical articles; these operations warrant the expenditure of considerable amounts of time for a change in setup. The changes in setup must be carried out by skilled workmen and often necessitate the use of special auxiliary equipment.

SUMMARY OF THE INVENTION

An object of the invention is to provide a multiple-spindle machine which can be rapidly converted for treatment of different types and/or sizes of workpieces so that it can be economically utilized for the manufacture of short or long runs of articles.

Another object of the invention is to provide a multiple-spindle machine with novel and improved means for moving the cross slides and main tool slides with reference to the work spindles and wherein a relatively small number of different tools suffices to carry out a large number of different machining operations.

A further object of the invention is to provide a multiple-spindle machine tool which exhibits all advantages of presently known multiple-spindle machine tools but is cheaper, more versatile, easier to operate and requires less supervision than conventional machine tools.

An additional object of the invention is to provide a multiple-spindle machine wherein the setup preparatory to treatment of a different type and/or size of workpieces can be changed within a fraction of the time which is required to change the setup in a conventional machine.

The improved multiple-spindle machine comprises a frame, an indexible carrier which is rotatably mounted in the frame and supports a plurality of equidistant axially parallel driven work spindles provided with chucks or analogous work-engaging elements which are movable to a plurality of working stations in response to indexing of the carrier, a plurality of cross slides or side slides mounted on the frame adjacent to at least some of the working stations and movable back and forth transversely of the workpieces which are held by the chucks at the respective stations, a stationary support which is preferably mounted on the frame and on an axial projection of the carrier, a plurality of main tool slides mounted on the support for reciprocatory movement in parallelism with the work spindles to move tools into and from engagement with workpieces held by the chucks at least at some of the working stations, discrete drive means provided on the frame for each slide and operative to advance the respective slides at a plurality of speeds, and control means which is preferably adjustable and serves to determine the extent of movement of the slides at each of the plurality of different speeds. The drive means may comprise hydraulically operated cylinder and piston assemblies and/or feed screws which are preferably moved axially by hydraulic motors.

The machine preferably further comprises special coupling means in the form of split nuts which serve to separably and adjustably connect the slides with the respective drive means. The aforementioned control means may form part of automatic programming means which controls the indexing of the carrier and the operation of the drive means.

The novel features which are considered as characteristic of the invention are set forth in particular in the appended claims. The improved machine tool itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is an enlarged side elevational view of a main tool slide in the machine tool of FIG. 1 and a longitudinal vertical sectional view of a drive which is employed to move such slide with reference to its support;

FIG. 4 is a transverse vertical sectional view as seen in the direction of arrows from the line IV—IV of FIG. 3;

FIG. 5 is an end elevational view of a clamping device which connects the slide of FIG. 3 with the drive;

FIG. 8 is a side elevational view of a main tool slide and a longitudinal vertical sectional view of a third drive which can be used to move such slide relative to its support; and FIG. 9 is a side elevational view of a support for the main tool slides in the machine tool of FIG. 1, further showing the manner in which the ends of the support are mounted in the frame and on the work spindle carrier.

DESCRIPTION OF THE PREFERRED EMBODIMENTS

Figure 1:
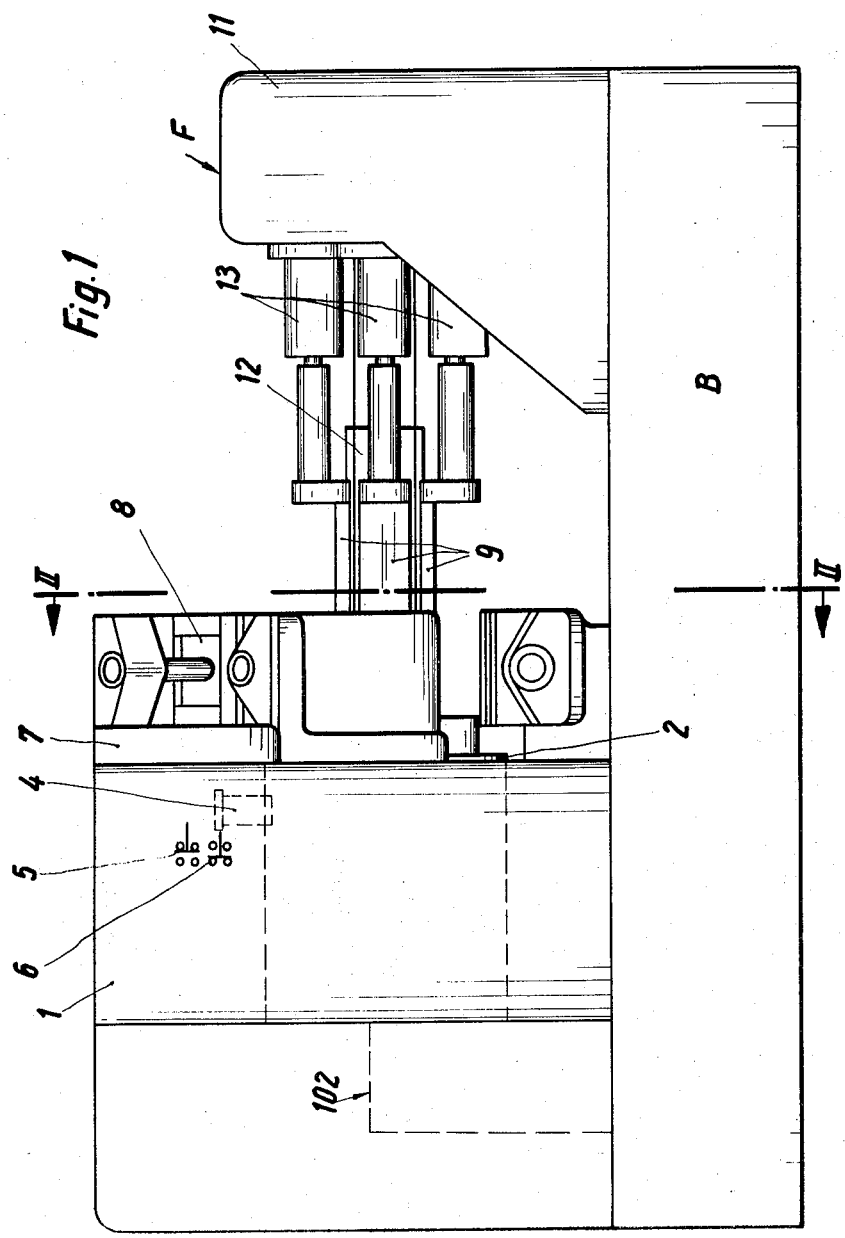
FIG. 1 is a schematic side elevational view of a multiple-spindle machine tool which embodies the invention.
Figure 2:
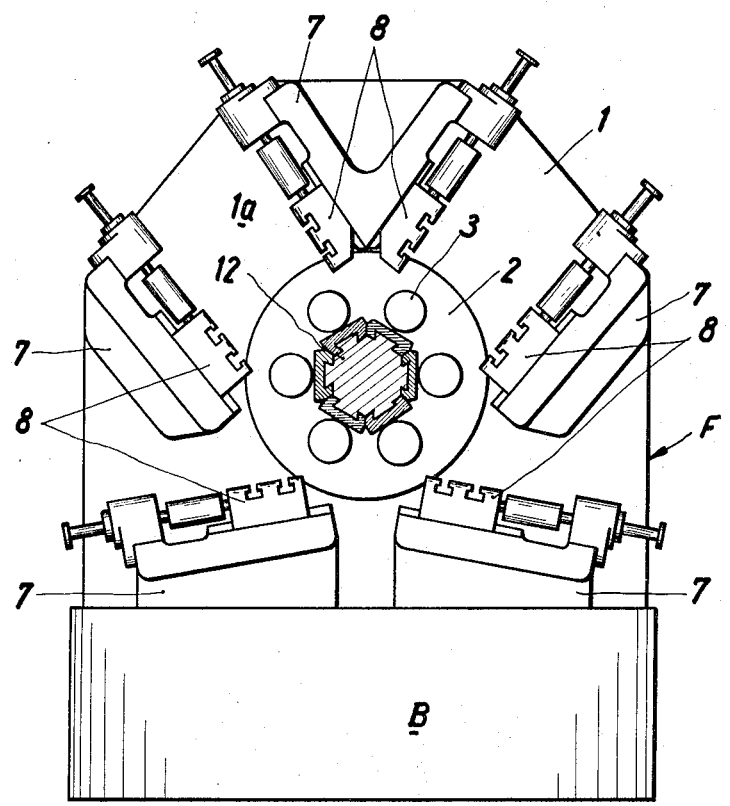
FIG. 2 is a transverse vertical sectional view as seen in the direction of arrows from the line II—II of FIG. 1.

Referring first to FIGS. 1 and 2, there is shown a multiple-spindle machine tool or automatic which comprises a frame F having a base B and two upstanding frame members 1 and 11. An indexible carrier 2 is rotatable in the frame member 1 about a horizontal axis and supports six equidistant parallel work spindles 3 having work-engaging elements in the form of chucks 25 or the like (FIG. 3) located between the frame members 1 and 11. The indexing mechanism 102 for the carrier 2 is installed in or on the frame member 1. A locking pin 4 is movable in the frame member 1 to and from the illustrated operative position in which it rigidly locks the carrier 2 in one of six predetermined angular positions. When the locking pin 4 is retracted (upwardly, as viewed in FIG. 1), the carrier 2 can be indexed by the mechanism 102 to advance all of the work spindles 3 by a step. The positions of the locking pin 4 are monitored by two electric switches 5 and 6 which produce signals when the pin 4 is respectively moved to its retracted and operative positions. The actuation of the switch 5 can initiate an indexing operation by the mechanism 102 and the actuation of the switch 6 can trigger a complete working cycle during which the workpieces (see the workpiece 26 of FIG. 3) which are held by the corresponding chucks 25 are treated by one or more tools.

The surface 1a of the frame member 1 further supports six suitably distributed cross slides or side slides 8 each of which is preferably (but not necessarily) mounted on a discrete support 7 (see the two uppermost slides 8 of FIG. 2). The cross slides 8 are movable substantially radially of the adjoining work spindles 3, i.e., each cross slide 8 is movable substantially radially of a different chuck 25. The supports 7 are provided with ways for suitable rails or grooves of the cross slides 8. The surface 1a is adjacent to the chucks 25.

The machine further comprises six main tool slides 9 which are movable in parallelism with the work spindles 3 in ways 10 (see FIG. 3) provided therefor on a substantially hexagonal support 12 which is fixedly secured to the frame member 11 and which can also be secured to the frame member 1 in a manner to be described in connection with FIG. 9.

The slides 8 and 9 are movable independently of each other by twelve discrete drives or drive means one of which is illustrated in FIG. 3 and serves to reciprocate one of the main tool slides 9 along the respective ways 10 of the support 12. In accordance with one of the presently preferred embodiments of the invention, the slides 8 and 9 can be moved by hydraulic drive means which are designed to move the respective slides at several speeds, for example, so that the slides can perform rapid traverse movements in order to advance the respective tools close to the corresponding workpieces and thereupon slower infeed movements during actual penetration of tools into the material of the workpieces.

The hydraulic drive means which is shown in FIG. 3 comprises a double-acting hydraulic cylinder 13 which is secured to the frame member 11 opposite the carrier 2 and accommodates a reciprocable piston 15 having a motion transmitting piston rod 14 which extends through and beyond both end walls of the cylinder 13. It is clear that the machine comprises six cylinders 13, one for each of the main tool slides 9 (see FIG. 1). Furthermore, the drive means for each cross slide 8 may also comprise a hydraulic cylinder corresponding to the cylinder 13 of FIG. 3. The piston rods 14 are held against rotation with reference to the respective cylinders 13 in a manner not specifically shown in the drawing.

Referring again to FIG. 3, the left-hand end portion of the piston rod 14 is provided with external threads 14a located without the cylinder 13 and at that axial end of this cylinder which is nearer to the carrier 2. The main tool slide 9 has an externally threaded projection 16 which is coaxial with the piston rod 14 and whose threads have the same inclination but a lead which is different from the lead of the threads 14a. Thus, the axial advance of a nut which meshes with the projection 16 and is rotated through 360° is different from the axial advance of a nut which meshes with the threads 14a. The piston rod 14 is separably connected to the projection 16 by a coupling device in the form of a split nut 17 (see also FIG. 5) which can be opened up to facilitate its separation from the parts 14, 16 and lengthwise adjustment of the main tool slide 9 with reference to the piston rod 14. The nut 17 is provided with two sets of threads which respectively mesh with the threads of the projection 16 and with the threads 14a when the nut 17 assumes the position shown in FIG. 3. A clamping means here shown as a bolt and nut assembly 171 is provided to hold the sections of the nut 17 in closed positions and such clamping assembly also serves to clamp the nut 17 with a force which prevents accidental axial movements of the projection 16 with reference to the piston rod 14 or vice versa.

Prior to applying the nut 17 over the parts 14 and 16, the operator can move the main tool slide 9 to a desired position with reference to the ways 10 of the support 12 to thus effect a coarse adjustment of the position of a tool 18 (e.g., a turning or milling tool) which is mounted on a tool holder 24 secured to the main tool slide 9 (see also FIG. 4). In order to effect a precise or fine adjustment of the tool 18 with reference to the piston rod 14 and piston 15, the operator will place the split nut 17 over the parts 14, 16 and will connect the two halves or sections of the nut 17 to each other by the clamping assembly 171 of FIG. 5 to such an extent that the internal threads of the nut 17 mesh without play with the corresponding threads on the projection 16 and piston rod 14 but that the nut 17 can be rotated about its axis, i.e., relative to the projection 16 and piston rod 14. This enables the operator to accurately select the distance between the piston 15 and the tool 18 in the holder 24 on the respective main tool slide 9. In the next step, the clamping assembly 171 is tightened to such an extent that the nut 17 cannot rotate whereby the distance between the tool 18 and the piston 15 remains unchanged. The just described parts 17 and 171 allow for rapid separation of the main tool slide 9 from the associated hydraulic cylinder and piston assembly as well as rapid and convenient coarse and fine adjustments of the distance between the tool 18 and the piston 15.

That end portion of the piston rod 14 which extends rearwardly or outwardly beyond the cylinder 13 carries a flange-like actuating member or trip 23 which can actuate at least three longitudinally spaced signal generating elements in the form of electric switches. Three such switches are shown in FIG. 3, as at 20, 21 and 22. The trip 23 is preferably concealed in the interior of the frame member 11 together with the switches 20–22 to avoid accidental tripping or damage thereto. The trip 23 actuates the rightmost switch 22 when the piston rod 14 reaches the rear or outer end of its stroke. The switch 20 is actuated by the trip 23 when the piston rod 14 reaches the forward or inner end of its stroke. The intermediate switch 21 is preferably adjustable in directions indicated by a double-headed arrow 121 and can perform one or more functions. For example, the switch 21 can control a system of valves (not shown) which admit a pressurized hydraulic fluid into the right-hand chamber of the cylinder 13 so that the valves reduce the speed of forward movement of the main tool slide 9 at a desired moment, namely, when the tool 18 on the slide 9 is about to start with removal of material from the workpiece 26 at the respective working station. As shown in FIG. 3, the piston 15 actually abuts against the right-hand end wall of the cylinder 13 when the trip 23 actuates the switch 22, and the piston 15 will abut against the left-hand end wall of the cylinder 13 when the trip 23 actuates the switch 20. Thus, the piston 15 is a mechanical stop which can arrest the piston rod 14 (and hence the slide 9) in each of its two end positions.

The intermediate switch 21 (or a further switch which is installed between the switches 20 and 22) can also perform one or more additional functions. For example, the switch 21 can be positioned in such a way that it is actuated by the trip 23 at the exact moment when the corresponding main tool slide 9 is retracted from the frame member 1 toward the frame member 11 to such an extent that the tool and/or tool holder on such main slide cannot interfere with indexing of the carrier 2. The signal from the switch 21 can automatically start the indexing mechanism 102 for the carrier 2 so that the latter is being indexed while the main tool slide 9 continues to move toward its fully retracted position in which the trip 23 actuates the switch 22. Such mode of operation reduces the periods of idleness of the machine by insuring that the indexing of the carrier 2 takes place simultaneously with retraction of the main tool slides 9.

The tool 18 of FIGS. 3 and 4 can be used to reduce the diameter of the workpiece 26 which is held in and rotates with the chuck 25 of the corresponding work spindle 3. The drive means for rotating the work spindles 3 forms no part of the present invention.

Figure 6:
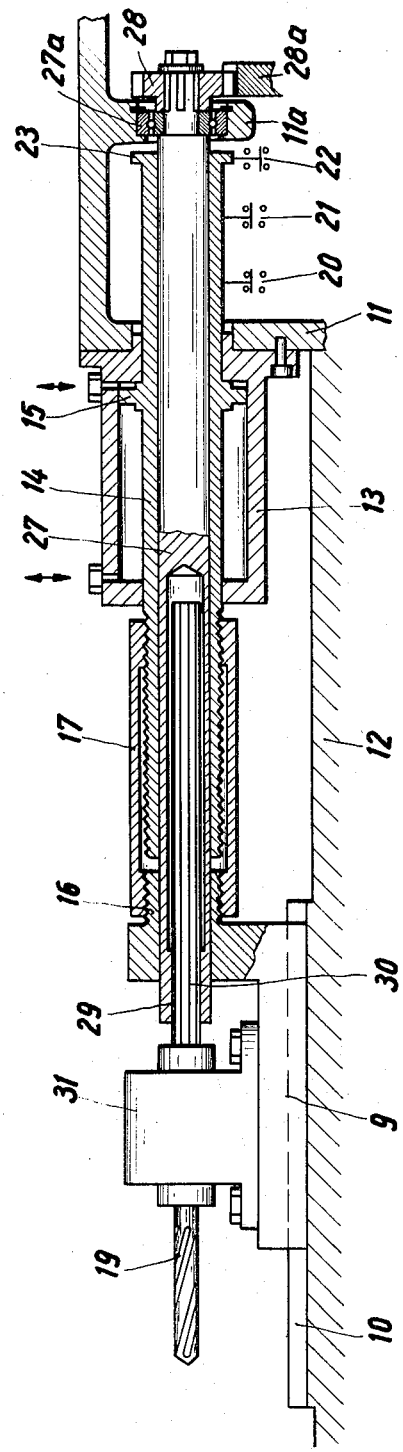
FIG. 6 is a partly elevational and partly longitudinal sectional view of a main tool slide and a longitudinal sectional view of a modified drive which is utilized to move the slide with reference to its support, further showing a portion of an attachment which serves to rotate a tool in a tool holder mounted on the main tool slide.

FIG. 6 illustrates a portion of a special attachment which can be used in connection with a main tool spindle 9 to rotate a boring tool 19 mounted in a holder 31. Special attachments which can be used in the machine of the present invention may include thread-cutting attachments, attachments which can synchronize the movements of tools in the respective slides with rotary movements of workpieces in the respective work spindles 3 and/or many others. Such attachments are normally mounted opposite the carrier 2, i.e., on or at the frame member 11.

The main tool slide 9 of FIG. 6 has an externally threaded projection 16 which is provided with an axial through bore, and the motion-transmitting piston rod 14 is also provided with an axial through bore which receives the shaft 27 of an attachment serving to rotate the tool 19 at a preselected speed. The manner in which the hollow projection 16 is coupled to the piston rod 14 by a split nut 17 is the same as described in connection with FIGS. 3 and 5. That end portion of the shaft 27 which extends rearwardly and beyond the trip 23 on the piston rod 14 carries a gear 28 which is driven by the gear 28a of a variable-speed transmission. The rear end portion of the shaft 27 is rotatable in a bearing 27a mounted in an internal partition 11a of the frame member 11. FIG. 6 shows clearly that the trip 23 and the switches 20–22 are concealed in and protected by the frame member 11.

The front end portion of the shaft 27 is provided with a blind bore 29 surrounded by a fluted surface and serving to receive the splined rear end portion or shank 30 of the tool 19. The bore 29 is deep enough to insure that the tool 19 is driven by the shaft 27 while the main tool slide 9 moves between its foremost and rearmost positions. Thus, the shank 30 is free to move axially of, while it continues to receive torque from, the shaft 27 of the attachment.

Figure 7:
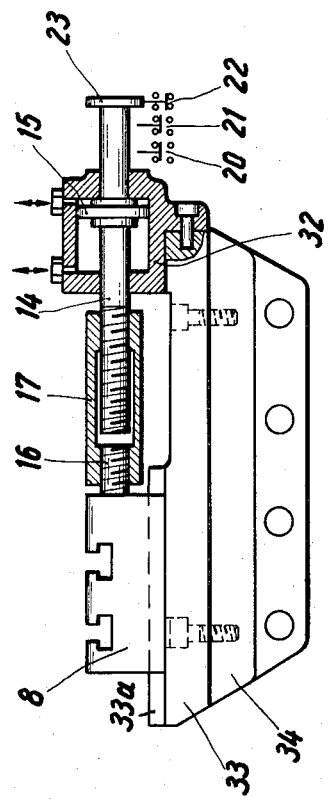
FIG. 7 is a side elevational view of a cross slide and a longitudinal vertical sectional view of a drive which is used to move the cross slide relative to its support.

FIG. 7 illustrates the hydraulic drive means for a cross slide 8. Such drive means is identical with or analogous to the drive means for the main tool slide 9 of FIG. 3 and its component parts are denoted by similar reference characters. The cylinder of the drive means is shown at 32, and this cylinder is secured to a plate 33 which is provided with ways 33a for the cross slide 8. The plate 33 is bolted to a bracket 34 which can replace one of the supports 7 of FIGS. 1–2 or can be secured to such support. It may be desirable to employ identical brackets 34 and identical plates 33 for all of the cross slides 8 to reduce the manufacturing cost as well as to allow for convenient transfer of a bracket 34 to any one of the six working stations. The switches 20–22 shown in FIG. 7 are actuated by the trip 23 on the piston rod 14 and can serve the same purpose as the corresponding switches shown in FIG. 3. The nut 17 allows for rapid detachment of the projection 16 on the cross slide 8 from the motion-transmitting piston rod 14 as well as for rapid coarse and fine adjustment of the distance between a tool on the cross slide 8 and the piston 15 in the cylinder 32.

Referring to FIG. 8, there is shown a main tool slide 9 which receives motion from a drive constituting a modification of the drive shown in FIG. 3. The frame member 11 supports a casing 36 for a portion of a motion transmitting feed screw 35 which is held against rotation in a manner not shown in the drawing. The casing 36 further accommodates a nut 37 which meshes with the feed screw 35 but is held against axial movement. An annulus of gear teeth 371 on the nut 37 meshes with a driver gear 38 on the output shaft of a motor 39, e.g., a hydraulic motor, which is mounted on the frame member 11 and is preferably operable at several speeds. The front end portion of the feed screw 35 is externally threaded, as at 35a, and meshes with the internal threads of a split nut 17 which is preferably identical with the nut 17 of FIGS. 3 and 5. A second set of internal threads in the nut 17 has a different lead but the same inclination and meshes with the external threads of the projection 16 on the main tool slide 9. Thus, the slide 9 can be coupled with, uncoupled from as well as coarsely and finely adjusted with reference to the feed screw 35 in the same way as described for the slide 9 and piston rod 14 of FIG. 3. The rear end portion of the feed screw 35 extends into the interior of the frame member 11 and carries a trip 23 which can actuate three switches 20–22, for example, in the same way as described in connection with FIG. 3.

If desired, the hydraulic motor 39 can be replaced by a hydroelectric stepping motor or any other suitable prime mover. A stepping motor is of advantage when the operation of the machine is to be controlled by a digital computer. Thus, if the slides receive torque from properly selected motors, the entire operation can be programmed and controlled by a suitable computer which allows for economical treatment of short or long runs of workpieces, especially certain types of workpieces, without requiring long periods of idleness for changes in setup.

It is clear that the drive means of FIG. 7 can be replaced by a drive means of the type shown in FIG. 8, i.e., that the piston rod 14 and cylinder 32 of FIG. 7 can be replaced with a feed screw 35, nut 37 and motor 39.

The trip 23 of FIG. 8 may serve as a means for actuating the switches 20–22 as well as a mechanical stop which actually engages the casing 36 and/or the frame member 11 to arrest the feed screw 35 in its foremost position. A second disk-shaped stop 40 is provided on the feed screw 35 rearwardly of the split nut 17 to abut against the casing 36 when the feed screw 35 reaches the rear end of its stroke.

It is further clear that the feed screw 35 and the projection 16 of FIG. 8 can be provided with registering axial bores to take a shaft (see the shaft 27 of FIG. 6) which can transmit torque to a rotary tool in a holder on the main tool slide.

FIG. 9 illustrates one presently preferred embodiment of the support 12 for main tool slides 9. One end of the support 12 is fixedly but separably secured to the frame member 11 by means of bolts 41, screws or analogous fasteners. The right-hand end portion of the support 12 is preferably provided with a centering plug 42 which is receivable in a complementary socket 44 of the frame member 11 and such right-hand end portion can be further provided with an annulus of teeth 43 which can mate with complementary teeth of the frame member 11 so that the support 12 is properly centered and can be held in an accurately determined angular position. The support 12 is coaxial with the carrier 2 and the latter is provided with an axially extending projection or stud 45 of preferably cylindrical outline which can serve as a means for supporting and centering the left-hand end portion of the member 12. To this end, the connection between the parts 12, 45 comprises a two-piece sleeve or shell having a first section 46 which is rigid with the support 12 and surrounds one half of the stud 45 and a second section 47 which is separably but safely secured to the section 46 by screws or analogous fasteners 48 and surrounds the other half of the stud 45.

The support 12, together with the main tool slides 9 thereon, can be rapidly detached from the frame member 11 and carrier 2 to be replaced with another support 12 which carries a different set of slides 9. This reduces the time which is required for changing the setup, especially if the previously used support 12 is to be reinserted after a relatively short period of use of another support 12. The tools and tool holders on the support 12 which is detached from the parts 11 and 45 can remain secured to such support if the latter is to be used again without any appreciable changes.

A multiple-spindle machine which embodies the aforedescribed hydraulic drive means for the cross slides and main tool slides (such as shown in FIGS. 3, 6 and 7) can be operated in a fully automatic way by resorting to a suitable electrical follow-up control system. The principal element of such control system is a control element which synchronizes the movements of various slides, of eventually utilized attachments and of other movable parts of the machine, such as the drive means for the work spindles 3 and the indexing means 102 for the carrier 2. If the on-line operation of the improved multiple-spindle machine is controlled by a computer, the aforementioned control element or synchronizing element can be omitted because its functions are taken over by the computer.

If the operation of the multiple-spindle machine is to be regulated by an electrical follow-up control system, the carrier 2 is indexed by the mechanism 102 and the switch plate for the selected type of workpieces is inserted into the control element or synchronizing element and locked in position to thus determine the sequence of operations of various movable parts. If necessary, the chucks 25 (or analogous work-engaging elements) are replaced or adjusted to properly accept and hold the blanks. In order to facilitate adjustment of chucks 25, one can resort to sample workpieces or adjustable masters which are inserted into the chucks during adjustment and are thereupon removed.

The procedure in adjusting the slides 8 and 9 is as follows. In the first step, the split nuts 17 are removed and the piston rods 14 or feed screws 35 are moved to their foremost positions. The slides 8 and 9 are thereupon shifted by hand into their foremost positions corresponding to the front ends of their working strokes and the tools are inserted into their holders, adjusted (if necessary) and fixed in optimum positions.

In the next step, the nuts 17 are opened and applied over the respective projections 16 and the threads 14a or 35a. The clamping means 171 are tightened sufficiently to allow for proper clearance-free engagement of the two sets of threads in the nuts 17 with the corresponding threads on the projections 16 and the piston rods 14 or feed screws 35 but to allow for rotation of the nuts 17 in order to effect, if necessary, accurate adjustments of the distance between the tools and the corresponding parts 14 or 35. The adjustments are terminated when the tools assume their accurately determined front end positions while the respective pistons 15 or feed screws 35 also dwell in the front end positions. The clamping means 171 are thereupon tightened to prevent any further changes in the positions of tools with respect to the parts 14 or 35.

When the precise adjustment of all tools is completed, the slides 8 and 9 are driven to their retracted positions at the setup speed and the aforementioned samples or masters (if needed during adjustment of tools) are removed from the chucks 25.

In the next step, a first workpiece is inserted into a chuck and is transported and treated at the various working stations in a testing operation. Eventual deviations of dimensions of the finished workpiece from desired dimensions, insofar as they are caused by inaccuracies in lengthwise movement of slides 8 and/or 9 with reference to their ways 10 or 33a, are eliminated by loosening the clamping means 171 and effecting an appropriate adjustment of the respective split nuts 17.

The actual operation is started subsequent to completed indexing of the carrier 2 by the mechanism 102 in retracted positions of all slides 8 and 9. Thus, all of the switches 22 should be engaged by the respective trips 23. The drive for the work spindles 3 is adjusted and started to rotate the work spindles at a desired speed. When the automatic operation is started, the slides 8 and 9 are moved forwardly in preselected sequence, first at a higher speed and thereupon at a lower speed in response to actuation of switches 21 by the respective trips 23. The workpieces are treated while the slides 8 and 9 are moved at the lower speed. When a trip 23 reaches the respective switch 20, the forward movement of the respective slide 8 or 9 is terminated and the slide is rapidly returned to its retracted or rear end position. When all of the slides 8 and 9 have completed their forward strokes and thereupon return to their retracted positions, the indexing mechanism 102 receives a signal and rotates the carrier 2 so that each work spindle 3 advances from a preceding to the next-following working station. The indexing of the carrier 2 must be preceded by a retraction of the locking pin 4 (i.e., by an actuation of the switch 5 shown in FIG. 1), and the completion of an indexing step is followed by return movement of the pin 4 to its operative position in which it actuates the switch 6. The new cycle begins in response to actuation of the switch 6, i.e., subsequent to locking of the carrier 2 in its new angular position.

In order to enhance the versatility of the multiple-spindle machine, the signals furnished by all switches, detectors and analogous parts (e.g., the switches 5, 6 and 20–22) are preferably transmitted to the aforementioned control element. The latter transmits signals to solenoids or like signal receiving (controlled) regulating members for various valves which control the admission and evacuation of fluid from the cylinders 13, 32 and motor or motors 39. By properly connecting the signal transmitting and signal receiving parts, the control element can insure that each switch, detector or an analogous signal transmitting or signal generating part can trigger the operation of one, more or all signal receiving parts.

If it is necessary to employ a tool which is to form a radial cut into a revolving workpiece, the tool is mounted on one of the main tool slides 9. A starting signal at first triggers a movement of the respective slide 9 in a direction toward the respective chuck 25 in a manner as described above. When the slide 9 reaches its foremost position which corresponds to the working position of the respective tool, the corresponding switch 20 initiates the forward movement of the associated cross slide or slides 8 which move forwardly first at a higher speed and thereupon at a lesser speed. The cross slide or slides 8 are thereupon caused to rapidly return to their retracted positions in response to actuation of the respective switches 20. Once the cross slide or slides 8 return to their retracted positions, the corresponding switches 22 are actuated and transmit signals to the drive means for the main tool slide 9 which is caused to return to its retracted position. The operation is terminated when the trip 23 which shares the rearward movement of the slide 9 actuates the respective switch 22.

Certain important advantages of our improved multiple-spindle machine can be summarized as follows:

The time required to completely or partially change the setup prior to beginning the treatment of a different lot of workpieces is but a small fraction of the time which is required to change the setup in a conventional machine. The rapid traverse and slower infeed movements of various slides can be optimally adapted to the nature of various treatments to which the workpieces must be subjected by the respective tools. Also, the positions of slides with reference to their drive means (including coarse adjustment and precise adjustment) can be completed rapidly, accurately and with the exertion of minimal physical effort. The construction of the machine is extremely simple and it can be rapidly converted to take a larger number of slides and/or a desired number of special attachments. The working stations are readily accessible because the motion transmitting parts need not extend close to the spaces which accommodate the workpieces, and the evacuation of shavings, chips and other particles can proceed without any interference on the part of elements of the drive means. A very large number of operations can be carried out by universal tools, and the various slides may receive motion from different types of drive means. The operation of the machine can be readily programmed in any one of several ways including the use of computers. Each of the slides, including the cross slides, can accept a large variety of tool holders including turrets for sets of different tools.

It is clear that the improved multiple-spindle machine is susceptible of many additional modifications without departing from the spirit of the invention. For example, the number of work spindles 3 can be reduced below or increased above six, and the extent of forward and/or rearward movements of some or all of the slides 8 and/or 9 can be regulated exclusively by preferably adjustable mechanical stops. The stops which determine the extent of forward movement of one or more slides 8 and/or 9 can be provided on the carrier 2. In a machine whose operation is controlled by a computer, the switches 20, 22 and/or the mechanical stops for the slides 8 and 9 can be dispensed with. As a rule, the switches 20, 22 will be retained for the sake of safety but their presence is optional. It is also possible to furnish the machine with a number of cross slides 8 and/or main tool slides 9 which is less than the number of work spindles, especially if the machine is to be furnished at a reduced cost.

The various switches can be considered as forming part of an automatic programming system which can be of the follow-up type or a computer.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a multiple-spindle machine, a combination comprising a frame; an indexable carrier rotatably mounted in said frame; means for indexing said carrier; a plurality of equi-distant axially parallel driven work spindles rotatably mounted in said carrier and having work-engaging elements movable to a plurality of successive working stations in response to indexing of said carrier; a plurality of cross slides slidably mounted on said frame adjacent to at least some of said working stations and reciprocable substantially transversely of the work spindles at the respective stations; a stationary support mounted in said frame; a plurality of main tool slides reciprocably mounted on said support for movement in parallelism with the work spindles to move tools into and from engagement with workpieces held by the work-engaging elements at least at some of said stations; discrete drive means provided on said frame for each of said cross slides and main tool slides and operative to advance the respective slides; and coupling means for individually connecting each of said slides with the respective drive means and for adjusting each of said slides along their reciprocal path relative to the work pieces.

2. A combination as defined in claim 1, wherein each of said drive means is adapted to advance the respective slide, and including control means for determining the extent of movement of said slides.

3. A combination as defined in claim 2, wherein said control means includes switch means which controls the indexing of said carrier and the operation of said drive means.

4. A combination as defined in claim 1, wherein at least one of said drive means comprises a hydraulic motor.

5. A combination as defined in claim 1, wherein at least one of said drive means comprises a feed screw, means for coupling said feed screw to the respective slide, and motor means for moving said feed screw axially.

6. A combination as defined in claim 1, wherein said slides are movable between spaced first and second end positions and further comprising mechanical stop means provided on said frame for arresting said slides in the respective end positions.

7. A combination as defined in claim 1, further comprising switch means for said drive means, said slides being movable between spaced first and second end positions and said switch means comprising means for generating signals in response to movement of said slides to said end positions thereof.

8. A combination as defined in claim 2, wherein said slides are movable between spaced end positions and through intermediate positions between such end positions, said control means including means for generating signals in response to movement of said slides to said intermediate positions thereof.

9. A combination as defined in claim 8, wherein at least one of said signal generating means is adjustable in the direction of movement of the respective slides.

10. A combination as defined in claim 1, wherein said slides are movable to and from end positions nearest to the respective working stations, and further comprising stop means at least partially concealed in said frame and arranged to arrest said slides in said end positions.

11. A combination as defined in claim 1, wherein at least one of said drive means comprises a reciprocable first portion having external threads and the respective slide comprises a second portion coaxial with said first portion and having external threads inclined in the same direction as but having a lead different from that of threads on said first portion, the common axis of said portions being parallel to the direction of movement of the respective slide relative to said frame, said coupling means including a nut having first and second sets of threads which respectively mesh with the threads of said first and second portions so that the distance between said portions changes in response to an angular movement between said portions and said nut.

12. A combination as defined in claim 11, wherein said nut comprises a plurality of sections which are movable together and apart to thereby allow for attachment of said nut to and for its separation from said portions.

13. A combination as defined in claim 12, further comprising clamping means for releasably holding said sections together.

14. A combination as defined in claim 1, wherein each of said drive means for said main tool slides comprises a reciprocable motion transmitting portion which is coaxial with one of said work spindles.

15. A combination as defined in claim 1, wherein at least one of said drive means comprises a reciprocable motion transmitting member connected with the respective slide and having an axial bore, and further comprising an attachment provided on said frame and having a rotary shaft received in said bore and arranged to transmit torque to a tool on the respective slide.

16. A combination as defined in claim 1, wherein said frame includes a frame member having a surface adjacent to said work-engaging elements, and further comprising a support for each of said cross slides, said last mentioned supports being mounted on said surface.

17. A combination as defined in claim 16, wherein each of said last mentioned supports comprises a bracket fixed to said frame member and a plate-like member secured to said bracket and having ways for the respective cross slide, said drive means for said cross slides being mounted on the respective plate-like members.

18. A combination as defined in claim 16, wherein said last mentioned supports are separably and interchangeably mounted on said frame member.

19. A combination as defined in claim 1, wherein said frame includes a frame member located opposite and spaced from said work-engaging elements, said support having end portions separably supported by said carrier and said frame member and said support being provided with ways for said main tool slides.

20. A combination as defined in claim 19, further comprising fastener means for fixedly securing one end of said support to said frame member and a sleeve provided at the other end of said support and surrounding a coaxial projection of said carrier.

21. A combination as defined in claim 20, wherein said sleeve comprises a plurality of sections and further comprising fastener means separably securing said sections to each other.

* * * * *